Jan. 21, 1958 M. F. WICHERS 2,820,393
EYE TESTING INSTRUMENT
Filed April 14, 1955 2 Sheets-Sheet 1

Max F. Wichers
INVENTOR.

Jan. 21, 1958 M. F. WICHERS 2,820,393
EYE TESTING INSTRUMENT
Filed April 14, 1955 2 Sheets-Sheet 2

Max F. Wichers
INVENTOR.

BY *Clarence A. O'Brien*
*and Harvey B. Jackson*
Attorneys

Patented Jan. 21, 1958

2,820,393

EYE TESTING INSTRUMENT

Max F. Wichers, Laredo, Tex., assignor of twenty-five percent each to Anton D. Wichers, Topeka, Kans., and Clara A. Bennett, Monticello, Iowa Application April 14, 1955, Serial No. 501,353

1 Claim. (Cl. 88—20)

This invention relates generally to eye testing devices and more particularly to an apparatus for testing and determining the character and extent of the indirect field of vision.

A further object of the invention resides in the provision of a device which will enable the visual field of each eye to be charted in a convenient and highly efficient manner.

An additional object of the invention resides in the provision of an optical instrument for use in testing the visual field of an eye which includes a uniform black background arranged along the visual field out to 60° in any meridian. Since any measurements beyond the 60° do not appear to be significant and can otherwise be easily checked, this instrument enables relatively complete and accurate data concerning the individual field of the eye to be charted.

An additional object of the invention resides in the provision of a testing device for determining the visual field of an eye which enables the utilization of various types of fixation members for use in determining their effect upon the visual field.

An additional features of the invention resides in the provision of a testing device on which the meridians and the degree markings may be sewn directly into the cloth of the covering for the device and through which pins or other markers may be thrust for charting the visual field.

Still further objects and features of this invention reside in the provision of a testing device of a simple construction, highly efficient in operation, inexpensive to manufacture, and easy to utilize.

These together with the various ancillary objects and features of the invention will become apparent as the following description proceeds, are attained by this optical instrument, a preferred embodiment of which has been illustrated in the accompanying drawings, by way of example only, wherein:

Figure 5 is a perspective view of an indicator for use in conjunction with the screen in testing the visual field of the eye;

Figure 6 is a perspective view of a modified form of indicator member; and

Figure 1:
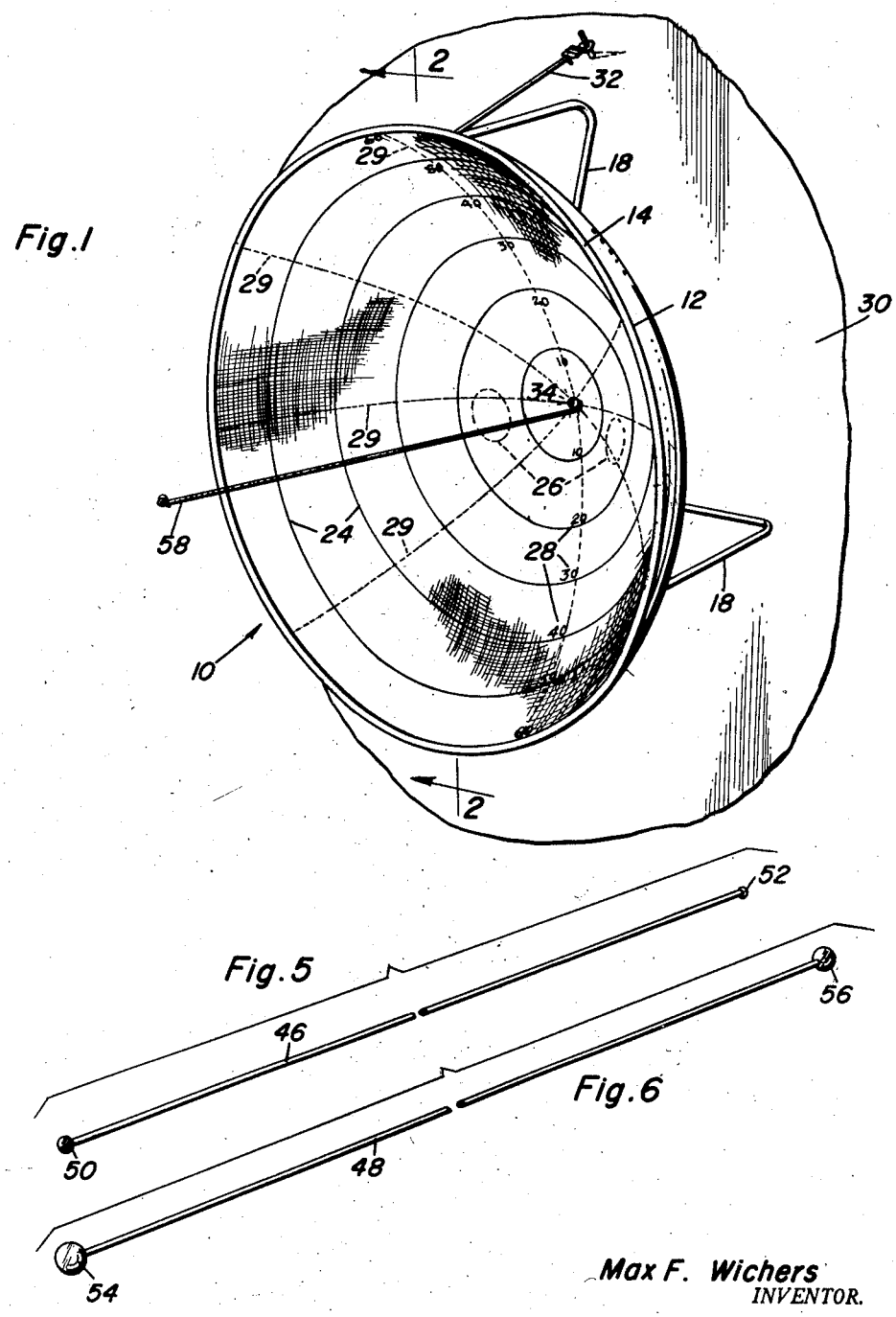
Figure 1 is a perspective view of the optical instrument comprising the present invention.

With continuing reference to the accompanying drawings wherein like reference numerals designate similar parts throughout the various views, reference numeral 10 is used to generally designate the optical instrument comprising the present invention. This optical instrument includes a frame 12 having an outer circular frame member 14 and reinforcing braces 16 of any suitable number to which stabilizing legs 18 or the like can be readily attached as by welding or the like. The frame 12 is preferably made of a lightweight material such as aluminum tubing but obviously other materials such as metals or plastics can be substituted if desired. Suitably affixed to the frame 14 in any convenient manner is a covering including an underlayer 20 of wire mesh preferably of hexagonal arrangement. Obviously, any suitable foraminous material may be substituted and secured thereto in any convenient manner as by sewing, adhesives, or the like is an outer covering 22 of suitable black cloth such as felt or the like. The outer surface of the cloth covering 22 is held in such position by the conformation of the screen as to form the inner surface of a 60° circular segment of a hollow sphere.

Sewn on the black felt by means of red thread or other suitable colored material are meridian lines as at 29 and sector lines 24. Other suitable indicia as at 26 may be applied on the outer covering as may be desired, and suitable degree indicia as at 28 may also be sewn for permanency.

In use, the screen is held on a suitable supporting surface such as a wall at 30 by means of a cable 32 or the like having the requisite strength. The entire apparatus is extremely light in weight and readily movable from one location to another. Secured to the screen by means of a pin 34 forming a portion thereof is a fixation member which may have any suitable surface such as a jeweled head 36 and a pearl body portion 38. In lieu of the fixation member 34, a fixation member as at 42 including a pin portion 40 and a circular mirror portion 44 may be provided. Various types of fixation members can be utilized for aid in charting the visual fields of the eyes, the different types of fixation member controlling the line of sight to varying degrees so as to modify the indirect field of vision.

Figure 2:
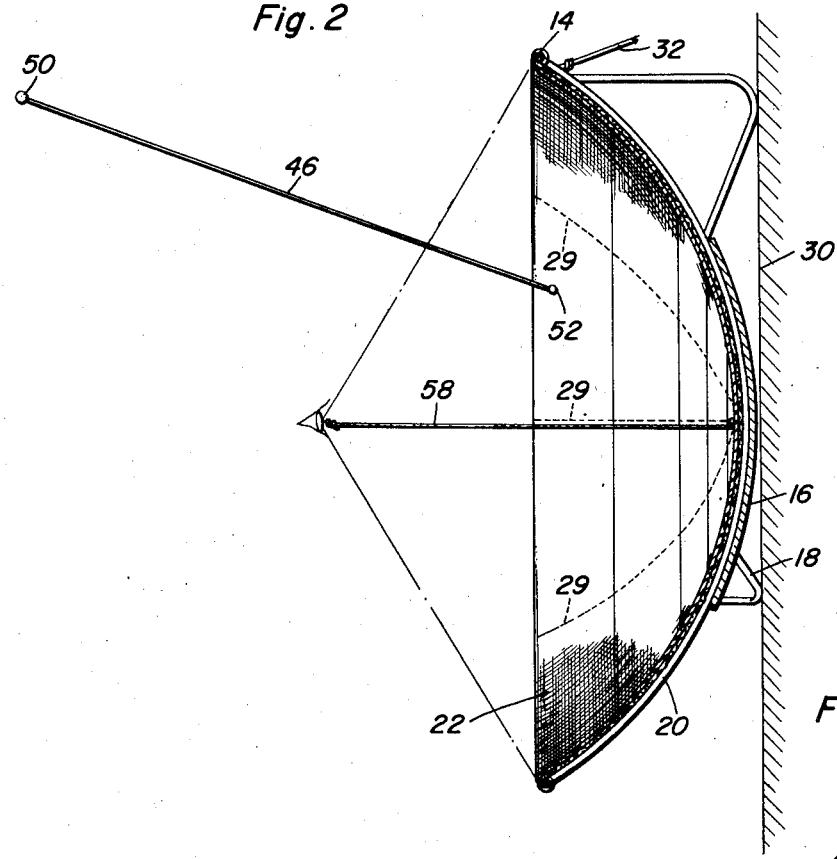
Figure 2 is a detailed sectional view as taken along the plane of line 2—2 of Figure 1.
Figure 7:
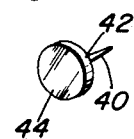
Figure 7 is a perspective view of a further type of fixation member employing a mirrored surface.
Figure 3:
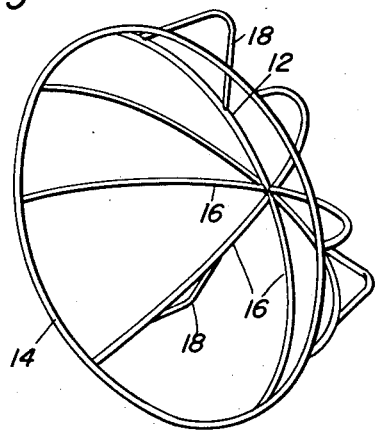
Figure 3 is a perspective view of the frame utilized in the invention.
Figure 4:
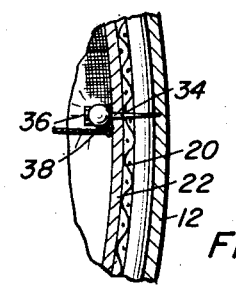
Figure 4 is an enlarged sectional detail view illustrating the manner in which a fixation member may be positioned.

In Figures 5 and 6 there are shown wands 46 and 48 which may have heads, as at 50, 52 and 54, 56 to be utilized in testing the visual field of the eye. Using a selected one of the wands 46 or 48 and positioning the head portion on a given point of the outer covering of the testing device 10, the therapeutist can ascertain whether or not the wand head 52 as shown in Figure 2 is within the visual field of the eye of the patient being tested. If in the affirmative, no action need be taken while if in the negative, a pin or other instrument may be pushed into the covering through the cloth covering 22 and between the meshes of the wire mesh material 20. Thus, a chart of the blank spaces in the visual field can be produced which will enable study of the data concerning the eye of the patient tested to be more readily obtained.

In order to position the eye of the patient being tested, a measuring cord 58 may be provided.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A device for testing the indirect field of vision of an eye comprising a frame adapted to be secured to a vertical supporting surface, a covering over said frame into which indicators can be removably inserted, and a fixation member centrally located and removably appended to said covering, said covering being held by said frame to conform to the inner surface of a circular segment of a hollow sphere, said covering including an underlayer of wire mesh material and an outer layer of cloth, said outer layer of cloth having meridianal and degree indicia sewn thereto, and a plurality of pins detachably adjustably secured upon said covering, said pins extending through said outer layer of cloth and between the meshing of said wire mesh material, said frame including a circular outer frame member interconnected by a plurality of arcuate braces, said covering being secured to said braces and a plurality of stabilizing feet attached to said brace and having the portions thereof remote from said frame coplanar.

References Cited in the file of this patent

UNITED STATES PATENTS

| | | |
|---|---|---|
| 1,212,424 | Tillotson | Jan. 16, 1917 |
| 1,347,761 | Shay | July 27, 1920 |
| 1,389,092 | Beach | Aug. 30, 1921 |
| 1,510,013 | Morton | Sept. 30, 1924 |
| 1,693,979 | Ferree et al. | Dec. 4, 1928 |
| 1,903,502 | Campbell | Apr. 11, 1933 |

FOREIGN PATENTS

| | | |
|---|---|---|
| 113,641 | Great Britain | Feb. 25, 1918 |
| 706,240 | Great Britain | Mar. 24, 1954 |

OTHER REFERENCES

Feldman et al.: Article in Archives of Ophthalmology, volume 36, November 1946, page 357.